United States Patent Office 2,819,052
Patented Jan. 7, 1958

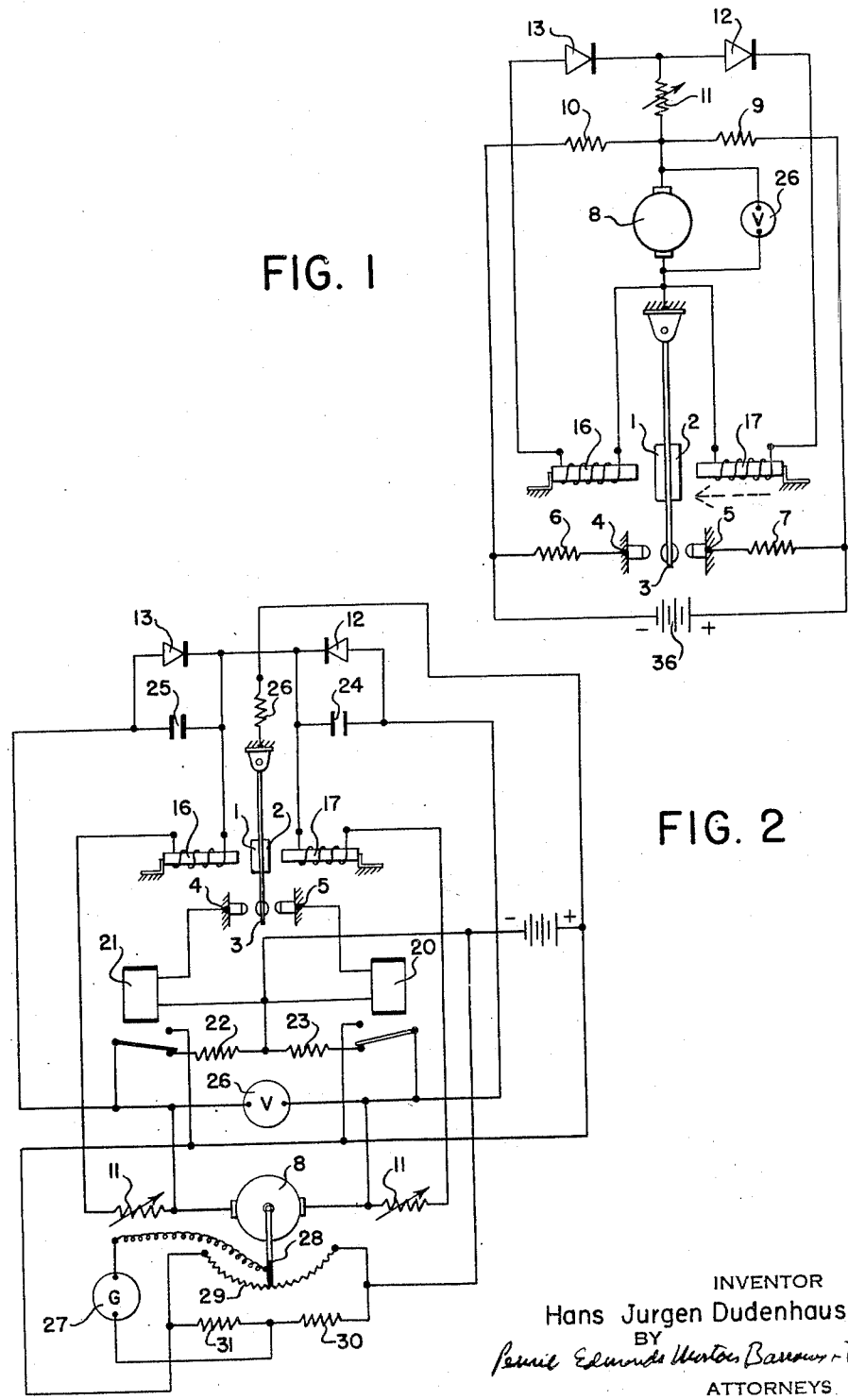

2,819,052
ACCELERATION MEASURING APPARATUS

Hans Jurgen Dudenhausen, Stuttgart, Germany, assignor to Intavex, Inc., New York, N. Y., a corporation of New York Application January 27, 1954, Serial No. 406,484

10 Claims. (Cl. 264—1)

My invention relates to an integrating accelerometer in the form of a small, light weight, reliable instrument.

The stabilizing of vehicles, particularly aircraft, by automatic controls, requires as measuring data the acceleration to which the vehicle is subjected and the integrated value of such acceleration. The approximately linear measuring range of a suitable accelerometer must in this connection be between 0.005 to about 0.5 times the acceleration of gravity g., while its natural frequency must be above 30 cycles per second.

The previously known accelerometers which comply with the above requirements require expensive apparatus since their very small acceleration measurement pulses must first of all be amplified by vacuum-tube or magnetic amplifiers in order to be able to supply a sufficient electrical or mechanical output which is proportional to the measurement value or the time integral of the measured value.

The object of the present invention is an integrating accelerometer suitable for airplanes, which is of very small volume and weight and of low cost of construction.

In accordance with the present invention, a ferromagnetic mass which can easily be shifted in the direction of acceleration to be measured, is arranged between the poles of two opposite electromagnet systems. The displaceability of the mass is limited to a few hundredths of a millimeter by stops which are developed as electric contacts. The armature voltage of a D. C. motor, with the direction of rotation controlled by these contacts, is connected for instance by a rectifier arrangement (electric switch) to that electromagnet system which opens the contact that has been closed by the force of acceleration.

The mode of operation and fundamental electromechanical design will be explained in further detail in connection with the figures of the accompanying drawings of which:

Figure 1 is a circuit diagram of a simple form of the invention; and

Figure 2 is a circuit diagram of a form of the invention illustrating application of means for reducing undesirable oscillation under small accelerating forces.

Referring to Figure 1, the range of deflection of a free pendulum, the mass of which is developed as armatures 1 and 2 of two opposite stationary electromagnet systems 16 and 17, is limited by the stationary contacts 4 and 5 to a few hundredths of a millimeter. The contact 3 which is rigidly connected with the pendulum comes against the mating contact 4 or 5 depending on the direction of the acceleration acting on the pendulum mass 1, 2, when an acceleration of 0.005 g. is exceeded, so that current is supplied to the shunt-wound motor 8 which is shown in this case as a D. C. motor. If for instance an acceleration of 0.2 g., in the direction shown by the dashed line arrow in Figure 1, acts on the pendulum mass, the contact 3 will come against the mating contact 4. The electric motor 8 will then be connected in a bridge circuit including a source of direct current potential difference 36 by means of the resistances 6, 7 and 9, 10. The motor 8 will consequently start rotating with full torque in one direction, dependent upon the polarity of the voltage applied to the motor 8, this being determined by which of the contacts 4 and 5 is engaged by the contact 3 coupled to the double armature 1, 2. Resistances 6 and 7 are preferably equal, and resistances 9 and 10 are likewise preferably equal. Resistances 6 and 7 serve to limit the current drawn from the source 36 in the event of a short circuit developing between contacts 4 and 5. Resistances 9 and 10 serve as a potential divider to provide at the terminal of motor 8 remote from contact 3 a voltage intermediate those on contacts 4 and 5. In this way provision is made for the application to the motor 8 of voltages of opposite polarity upon engagement of contact 3 with contacts 4 and 5 respectively, i. e. upon opposite accelerations of the mass 1, 2. The opposite polarities of the voltages thus developed across motor 8, as well as the opposite senses of rotation of the motor resulting therefrom, thus identify accelerations of opposite sign.

The voltage present on the motor 8 when contact 3 engages contact 4 effects a flow of current via the resistance 11 and the rectifier 12 through the coil 18, 19 of the electromagnet 17. No current flows through the winding of magnet 16 in view of the orientation of rectifier 13 with respect to the polarity of the voltage across the motor 8. By energization of the magnet 17 contacts 3, 4 are opened, for the stroke force of the electromagnets 16 and 17 is so dimensioned by selection of the ohmic value of resistance 11 that it is in equilibrium with a force corresponding to an acceleration of 0.5 g. on the pendulum mass 1, 2. By the opening of the pair of contacts 3, 4, the armature current of the motor 8 is however interrupted so that also the flow of current through the coil 18, 19 of electromagnet 17 is interrupted and the pair of contacts 3, 4 again closes due to the action of the above acceleration of 0.2 g. on the pendulum mass. This alternate opening and closing of the contacts 3, 4 is repeated with such frequency and contact closure time (about 30 cycles per second, depending upon the magnitude of the acceleration acting on the mass 1, 2) that there is developed on the winding 18, 19 of electromagnet 17 an average voltage and on electromagnet 17 a force which balances the acceleration, occurring here assumed to be of 0.2 g. This average voltage is a measure of the acceleration sought. Since the average voltage on the armature of the D. C. shunt-wound electric motor 8 is proportional to the average voltage on the coil 18, 19 of the electromagnet 17, the motor 8 rotates with a corresponding proportional average speed of rotation due to its voltage-speed characteristic. The speed of the motor 8, like the voltage across it, is therefore an additional measure of the acceleration to the measurement of which the system is directed. If the acceleration x.g acts in the direction opposite to that indicated by the dashed line arrow in Figure 1, the motor 8 will accordingly rotate with a speed of revolution proportional to this acceleration and therefore in the opposite direction.

Since the average voltage on the armature of the electric motor 8 is proportional in magnitude and polarity to the acceleration, x.g, a voltmeter 26 connected in parallel to the armature of the motor 8 may be used to indicate directly the magnitude of the acceleration and its direction.

The mode of operation of the device of Figure 2 for measuring accelerational forces is the same as that of the device according to Figure 1 with the exception that in this case the electric motor 8 is energized alternately via two relays 21 and 20 which are excited via the contacts 3, 4 and 3, 5 respectively, the circuits being so established that when contacts 3, 4 and 3, 5 are open, the armature of the motor 8 is shortcircuited via the resistances 22, 23. This effects a desired rapid electrical braking of the motor upon opening the contacts 3, 4 or 3, 5 respectively. In this way, an undesired oscillating of the contact 3 between contacts 4 and 5 is avoided if only small accelerations are acting on the pendulum mass. The same purpose is accomplished by the condensers 24, 25. If these condensers were not present, at the moment when for instance the contact 3 touches the contact 4 as a result of a small acceleration, so that voltage is placed on the motor 8 via the relay 21, the electromagnet 17 would instantaneously attain its full stroke force and separate the contact 3 from the contact 4 as desired. Because of the strongly accelerated relatively large pendulum masses 1, 2, the contact 3 then would slam against the contact 5 and thus bring about an undesired building up of the oscillations of this regulating device. The condenser 24 however due to its charging current produces a delayed building up of the magnetic field of electromagnet 17 and thus prevents any oscillating of the contact 3 from the contact 4 to the contact 5.

As already stated, the voltmeter 26 makes it possible to read the direction and magnitude of the acceleration $x.g$ acting on the pendulum. Frequently, there is required as measured value in regulating devices, for instance, for stabilizing the position and velocity conditions of aircraft, the time integral of the acceleration acting on the vehicle.

In Figure 2, the motor 8, via a reduction gearing not shown in the drawing, displaces the slider of an electric Wheatstone bridge, formed by the potentiometer 29 and the two resistances 30 and 31, the galvanometer deflection 27 of which gives the speed of the system.

I claim:

1. An accelerometer comprising a ferromagnetic armature, two electromagnets fixed with respect to each other in position to develop, upon energization of their windings, differently directed fields in a region of space, means supporting said armature within said region for motion with respect to said magnets upon acceleration of said armature, a first contact coupled to said armature for motion therewith relative to said magnets, second and third contacts positioned with respect to said magnets to be separately engaged by said first contact upon accelerations of said armature in different directions, two electrical circuits each including the winding of one of said magnets, and means including said contacts for selectively energizing said circuits upon engagement of said first contact with said second and third contacts respectively such that the magnet energized exerts upon said armature a force tending to separate the contacts so engaged.

2. An accelerometer comprising a ferromagnetic armature, two electromagnets fixed with respect to each other in position to develop, upon energization of their windings, differently directed fields in a region of space, means supporting said armature within said region for motion with respect to said magnets upon acceleration of said armature, a first contact coupled to said armature for motion therewith relative to said magnets, second and third contacts positioned with respect to said magnets to be separately engaged by said first contact upon accelerations of said armature in different directions, two electrical circuits each including the winding of one of said magnets, means including said contacts for selectively energizing said circuits upon engagement of said first contact with said second and third contacts respectively such that the magnet energized exerts upon said armature a force tending to separate the contacts so engaged, and means to measure the time average of the voltage across said windings.

3. An accelerometer comprising a ferromagnetic armature, two electromagnets fixed with respect to each other in position to develop, upon energization of their windings, differently directed fields in a region of space, means supporting said armature within said region for motion with respect to said magnets upon acceleration of said armature, a first contact coupled to said armature for motion therewith relative to said magnets, second and third contacts positioned with respect to said magnets to be separately engaged by said first contact upon accelerations of said armature in different directions, an electrical resistance, two electric circuits both including said first contact and said resistance and each including one of said second and third contacts and the winding of one of said magnets, said windings being connected in shunt relation to said resistance, said circuits being adapted to apply to said resistance voltages of opposite polarity upon energization of said circuits respectively by engagement of said first contact with said second and third contacts respectively, each of said circuits including the winding of that one of said magnets energization of which exerts on said armature a force tending to separate the contacts effecting energization of said circuit.

4. An accelerometer comprising a ferromagnetic armature, two electromagnets fixed with respect to each other in position to develop, upon energization of their windings, differently directed fields in a region of space, means supporting said armature within said region for motion with respect to said magnets upon acceleration of said armature, a first contact coupled to said armature for motion therewith relative to said magnets, second and third contacts positioned with respect to said magnets to be separately engaged by said first contact upon accelerations of said armature in different directions, an electric motor of known speed-voltage characteristics, two electric circuits both including said first contact and said motor and each including one of said second and third contacts and the winding of one of said magnets, said windings being connected in shunt relation to said motor, said circuits being adapted to apply to said motor voltages of opposite polarity upon energization of said circuits respectively by engagement of said first contact with said second and third contacts respectively, each of said circuits including the winding of that one of said magnets energization of which exerts on said armature a force tending to separate the contacts effecting energization of said circuit.

5. An integrating accelerometer comprising a ferromagnetic armature, two electromagnets fixed with respect to each other in position to develop, upon energization of their windings, differently directed fields in a region of space, means supporting said armature within said region for motion with respect to said magnets upon acceleration of said armature, a first contact coupled to said armature for motion therewith relative to said magnets, second and third contacts positioned with respect to said magnets to be separately engaged by said first contact upon accelerations of said armature in different directions, an electric motor of known speed-voltage characteristics, two electric circuits both including said first contact and said motor and each including one of said second and third contacts and the winding of one of said magnets, said windings being connected in shunt relation to said motor, said circuits being adapted to apply to said motor voltages of opposite polarity upon energization of said circuits respectively by engagement of said first contact with said second and third contacts respectively, each of said circuits including the winding of that one of said magnets energization of which exerts on said armature a force tending to separate the contacts effecting energization of said circuit, and means to measure the accumulated revolutions of said motor.

6. An accelerometer comprising a ferromagnetic armature, two electromagnets fixed with respect to each other in position to develop, upon energization of their windings, differently directed fields in a region of space, means supporting said armature within said region for motion with respect to said magnets upon acceleration of said armature, a first contact coupled to said armature for motion therewith relative to said magnets, second and third contacts positioned with respect to said magnets to be separately engaged by said first contact upon accelerations of said armature in different directions, a first electrical resistance, a second resistance in series with said first resistance, two series circuits connected in shunt with said first resistance, each of said circuits including a rectifier, said second resistance and the winding of one of said magnets, said rectifiers being oppositely poled with respect to a voltage of given polarity across said first resistance, and means including said contacts for applying voltages of opposite polarity to a series combination including said first resistance and second resistance upon engagement of said first contact with said second and third contacts respectively, said rectifiers being so poled that upon application of said voltages to said series combination current flows in the winding of that magnet whose field exerts on said armature a force tending to open the contacts so engaged.

7. An accelerometer comprising a ferromagnetic armature, two electromagnets fixed with respect to each other in position to develop, upon energization of their windings, differently directed fields in a region of space, means supporting said armature within said region for motion with respect to said magnets upon acceleration of said armature, a first contact coupled to said armature for motion therewith relative to said magnets, second and third contacts positioned with respect to said magnets to be separately engaged by said first contact upon accelerations of said armature in different directions, a first electrical resistance, a second resistance in series with said first resistance, two series circuits connected in shunt with said first resistance, each of said circuits including a rectifier, said second resistance and the winding of one of said magnets, said rectifiers being oppositely poled with respect to a voltage of given polarity across said first resistance, means including said contacts for applying voltages of opposite polarity to a series combination including said first resistance and second resistance upon engagement of said first contact with said second and third contacts respectively, said rectifiers being so poled that upon application of said voltages to said series combination current flows in the winding of that magnet whose field exerts on said armature a force tending to open the contacts so engaged, and a capacitor in shunt with each of said rectifiers.

8. An accelerometer comprising a ferromagnetic armature, two electromagnets fixed with respect to each other in position to develop, upon energization of their windings, differently directed fields in a region of space, means supporting said armature within said region for motion with respect to said magnets upon acceleration of said armature, a first contact coupled to said armature for motion therewith relative to said magnets, second and third contacts positioned with respect to said magnets to be separately engaged by said first contact upon accelerations of said armature in different directions, an electric motor, a first resistance in series with said motor, two series circuits connected in shunt with said motor, each of said circuits including a rectifier, a resistance and the winding of one of said magnets, said rectifiers being oppositely poled with respect to a voltage of given polarity across said motor, and means including said contacts and two relays for applying voltages of opposite polarity to a series combination including said motor and first resistance upon engagement of said first contact with said second and third contacts respectively, said rectifiers being so poled that upon application of said voltages to said series combination current flows in the winding of that magnet whose field exerts on said armature a force tending to open the contacts so engaged, said relays being arranged to connect said motor and first resistance into a closed series circuit when said first contact is disengaged from both of said second and third contacts.

9. An accelerometer comprising a mass, a housing supporting said mass for motion with respect thereto upon acceleration of said housing, two-part magnetic means of which one part is coupled to said housing and the other is coupled to said mass, one of said parts including a winding upon energization of which a force is exerted between said two parts, a first contact means coupled with said mass for motion therewith with respect to said housing, second and third contact means arranged on said housing to be engaged by said first contact means respectively upon accelerations of said housing in different directions, and means including said third contact means to energize said winding upon engagement of said second and third contact means respectively by said first contact means such that the force exerted between said two parts tends to disestablish the engagement so made.

10. An accelerometer comprising a mass, one or more ferromagnetic armatures coupled to said mass, two electromagnets fixed with respect to each other in position to develop, upon energization of their windings, differently directed fields, means supporting said armatures within said fields for motion with respect to said magnets upon acceleration of said mass, a first contact means coupled to said armatures for motion therewith, second and third contact means positioned with respect to said magnets to be separately engaged by said first contact means upon motion of said mass with respect to said magnets, an electric motor, a first resistance in series with said motor, two series circuits connected in shunt with said motor, each of said circuits including a rectifier, a resistance and the winding of one of said magnets, said rectifiers being oppositely poled with respect to a voltage of given polarity applied across said motor, and means including said contact means for applying voltages of oppositely polarity to a series combination including said motor and first resistance upon engagement of said first contact means with said second and third contact means respectively, said rectifiers being so poled that upon application of said voltages to said series combination current flows in the winding of that magnet whose field exerts on at least one of said armatures a force tending to open the contact means so engaged.

References Cited in the file of this patent

UNITED STATES PATENTS

| | | |
|---|---|---|
| 1,840,001 | Tsujita | Jan. 5, 1932 |
| 2,049,129 | McNeil | July 28, 1936 |
| 2,193,707 | Baumann | Mar. 12, 1940 |
| 2,210,970 | Bonell | Aug. 13, 1940 |
| 2,570,672 | Hathaway | Oct. 9, 1951 |
| 2,591,921 | Cosgriff et al. | Apr. 8, 1952 |

FOREIGN PATENTS

| | | |
|---|---|---|
| 884,137 | France | Apr. 12, 1943 |

U. S. DEPARTMENT OF COMMERCE
PATENT OFFICE

CERTIFICATE OF CORRECTION

Patent No. 2,819,052                                              January 7, 1958

Hans Jurgen Dudenhausen

It is hereby certified that error appears in the printed specification of the above numbered patent requiring correction and that the said Letters Patent should read as corrected below.

Column 1, line 17, for "stabilizing" read --stabilization--; line 18, strike out --measuring--; line 31, for "measurement" read --measured--; column 2, lines 22, 34, 41 and 47, strike out "18, 19", each occurrence; same column 2, line 43, after "acceleration" strike out the comma and insert the same after "here", same line; column 3, line 29, after "31, the" insert --indication of the--; line 30, for "of which gives" read --giving--; column 5, lines 4, 30 and 56, and column 6, line 38, strike out the comma, each occurrence, and insert instead the word --and--.

Signed and sealed this 4th day of March 1958.

(SEAL)
Attest:

KARL H. AXLINE                                                  ROBERT C. WATSON
Attesting Officer                                               Commissioner of Patents